United States Patent
Brenner et al.

(10) Patent No.: US 8,606,434 B2
(45) Date of Patent: Dec. 10, 2013

(54) REGULATOR DEVICE FOR HELICOPTERS

(75) Inventors: Hanno Brenner, Braunschweig (DE); Christoph Kessler, Braunschweig (DE)

(73) Assignee: Deutsches Zentrum fuer Luft—und Raumfahrt E.V., Cologne (DE)

( * ) Notice: Subject to any disclaimer, the term of this patent is extended or adjusted under 35 U.S.C. 154(b) by 369 days.

(21) Appl. No.: 12/868,051

(22) Filed: Aug. 25, 2010

(65) Prior Publication Data

US 2011/0192932 A1 Aug. 11, 2011

(30) Foreign Application Priority Data

Feb. 11, 2010 (DE) ...................... 20 2010 002 309 U

(51) Int. Cl.
*G01C 23/00* (2006.01)
*B64C 13/04* (2006.01)

(52) U.S. Cl.
USPC .............................................. 701/3; 244/220

(58) Field of Classification Search
USPC ..................... 701/3, 4–10, 42, 411, 502–514; 244/3.15–3.17, 3.23, 3.28, 3.29, 164, 244/7 A, 6, 8–11, 17.13–17.27, 220

See application file for complete search history.

(56) References Cited

U.S. PATENT DOCUMENTS

| 3,833,189 | A | * | 9/1974 | Fowler et al. | 244/177 |
| 4,763,280 | A | * | 8/1988 | Robinson et al. | 348/36 |
| 6,244,045 | B1 | * | 6/2001 | Purvis | 60/274 |
| 7,331,477 | B2 | * | 2/2008 | Schulte et al. | 212/270 |
| 2010/0054356 | A1 | * | 3/2010 | Keerthi | 375/267 |

* cited by examiner

*Primary Examiner* — Muhammad Shafi

(74) *Attorney, Agent, or Firm* — Whitham Curtis Christofferson & Cook, PC

(57) ABSTRACT

A regulator device used on helicopters carrying an external load suspended from the helicopter by a supporting cable aids in controlling the flight of the helicopter by measuring the oscillating movement of the external load, converting the detected variables for the oscillating movement to a geodetic coordinate system, generating a closed loop control signals as a function of the variables, and applying the closed loop control signals to open loop control signals which control the flight of the helicopter.

9 Claims, 5 Drawing Sheets

REGULATOR DEVICE FOR HELICOPTERS

FIELD OF INVENTION

The invention relates to a regulator device for helicopters which are carrying an external load suspended from the helicopter in the direction of the ground on at least one supporting cable, wherein the regulator device is designed to produce closed-loop control signals, which can be applied to open-loop control signals for controlling, the flight of the helicopter, and has at least one load oscillation recording unit for recording the oscillating movement of the external load in the lateral and longitudinal directions with respect to the longitudinal axis of the helicopter.

BACKGROUND

Helicopters are distinguished, inter alia, by the capability to transport or to pick up loads at points to which access is difficult. One type of transport is external load transport, in which the load is attached to the helicopter or to an external winch by means of a supporting cable harness, possibly in the form of a mesh, on one or more load hooks. However, the attachment of an external load to a helicopter changes the system dynamics and detracts from the flight characteristics. Furthermore, the flight control task of the pilot is increased by the task of monitoring the external load. The external load increases the complexity of the overall system to be flown, thus leading to an increase in the stress on the pilot and, in general, to a reduction in flight safety.

When external loads are being transported there is a risk of uncontrollable, low-frequency oscillating movements as a result of aerodynamic disturbances or control inputs. The oscillation can change to an unstable oscillating movement which, furthermore, can be instigated by pilot inputs. In the end, this can lead to pilot-induced oscillations. Since, the pilot can perceive the dynamic influence of an oscillating external load on the helicopter, but in general cannot see the external load, there is a risk, in certain cases, of the correction control inputs made by the pilot in order to damp the overall system amplifying the oscillating movement of the external load. This is because the pilot intuitively attempts to counteract the lateral force exerted on the helicopter by the oscillating external load, instead of following the load to a limited extent, in order to remove lateral forces from the external load. Severe oscillating movements of the external load endanger the overall system and its crew, since their influence on the helicopter can lead to it no longer being possible to control and stabilize the helicopter.

Furthermore, the precise positioning of external loads represents a problem, since the pilot in general does not see the load suspended under the helicopter, and the external load is in motion. Furthermore, the movement of the external load is influenced by the flight movement. The detection of the respective current positioning situation and the transmission and implementation of the control instructions imply latency times which in the end lead to the correction control for load positioning lagging behind the current situation. This is made worse because the pilot stress increases the longer it takes to position the load. The greater the pilot stress, the greater the extent to which correcting control inputs resulting from incorrect positioning are necessary, and therefore the more dynamic the development of the overall system. The greater the dynamic movement that occurs in the cable harness-external load system, the more difficult it is for the ground personnel to position and control the load and the longer the positioning process lasts, which in turn results in an increase in the pilot stress and in consequence leads to a greater susceptibility to errors. Furthermore, turbulence and restricted view increase the dynamics in the overall system.

DE 10 2008 025 298 A1 discloses a method and an apparatus for damping vertical oscillations in the case of a helicopter with an attached external load, in which oscillation sensors on the helicopter are used to detect the excitation of at least two eigen forms of vertical oscillation, and opposing forces to the vertical oscillations are introduced as a function of the phase and amplitude of the detected excitations, between the load pick-up point and the load harness, by means of an actively controlled linear actuator. This active damping system, which acts directly on the cable harness, does not have any direct effect on the closed-loop control of the attitude of the helicopter, but affects only the damping of the coupling of the cable harness and external load to the helicopter. This requires a separate damping unit, which must be matched to the helicopter suspension.

DE 22 33 938 C3, U.S. Pat. No. 3,833,189 A and U.S. Pat. No. 3,756,543 A disclose a load stabilization system which reacts, on the helicopter flight control and in which the oscillating movement of the external load is measured. The rate of change of the angle between the supporting cable and the vertical of the helicopter, and its filtered rate, are passed to the regulator as controlled variables.

Furthermore, for example, DE 10 2005 022 231 A1 and DE 10 2005 022 212 A1 disclose a method and an apparatus for displaying the orientation and the movement state of a load attached to a helicopter, in which the current position of the load is measured by sensors fitted to the load. For this purpose, the load must disadvantageously be provided with a sensor. Furthermore, a communication link must be set up between the sensor and the apparatus in the helicopter.

SUMMARY

Against this background, the object of the present invention is to provide an improved regulator device for helicopters which are carrying an external load which is suspended from the helicopter in the direction of the ground on at least one supporting cable.

The object is achieved by the regulator device of the type mentioned initially in that the regulator device is designed to convert the detected variables for the oscillating movement to the geodetic coordinate system, and to generate the closed-loop control signals as a function of the variables, converted to the geodetic coordinate system, for the oscillating movement and as a function of the mass of the external load and the supporting cable length as parameters for the regulator.

The closed-loop control system with controlled variables converted to the geodetic coordinate system has the advantage that the attitude of the helicopter to be determined, in particular such as the pitch angle, is calculated from the controlled variable.

Particularly for the effect of an external load on the helicopter, primarily the relative attitude between the external load and the helicopter in the helicopter coordinate system, the closed-loop control system according to the invention is based on consideration of the oscillating movement of the external load, in the geodetic coordinate system, separately from the attitude and the rotation rates of the helicopter itself. Independently of the attitude and rotation rate of the helicopter, this can then be influenced by the closed-loop control system such that it follows the external load in its absolute position in the geodetic coordinate system and, if possible, adjusts itself via the external load, in order to reduce oscillating movements. The attitude and rotation rate of the helicopter itself can then be kept within a permissible framework, independently of the reduction in the oscillation angle.

In addition to these variables for the oscillating movement in the geodetic coordinate system, the closed-loop control system also includes the mass of the external load and the supporting cable length, in order to make it possible to reduce the current force influences of the external load on the helicopter. This is because, during flight, the mass of the external load, for example in the case of a fire-fighting operation, can change by the extinguishing agent being dropped and/or the supporting cable length changing, for example when picking up or recovering objects.

It is advantageous if the detected variables for the oscillating movement are the changes in the oscillation angles between the connecting line from the external load to the suspension point on the helicopter and a vertical which points vertically downward from the suspension point of the helicopter parallel to the vertical axis of the helicopter. The oscillating movement is therefore first of all recorded once in the coordinate system of the helicopter. These variables, which are measured in the helicopter-fixed coordinate system, can then be converted easily to the geodetic coordinate system, after determining the attitude and rotation rates of the helicopter.

The oscillating movement of the external load can be determined reliably and easily by at least one image recording unit, which can be fitted underneath the helicopter and to which an image evaluation unit is connected. The image recording unit records an image or image sequences with the oscillating external load.

The attitude of the external load relative to the helicopter can then be calculated by suitable image evaluation methods, which are known per se, from the position of the external load in the images, with knowledge of the position and alignment of the image recording unit.

It is particularly advantageous for the regulator device to have a regulator part which corrects the phase response along the closed-loop control system, and a regulator part which corrects the amplitude response of the closed-loop control system. It has been found that pure loop gain leads to instability for critical flight situations, that is to say for configurations in which the oscillations are already at the stability limit or are unstable.

The profile of the frequency response can therefore be adapted such that an amplitude and phase boundary which is correspondingly adequate for the requirements is ensured, provided the loop gain is sufficiently high. This is done by splitting the regulator into a part which corrects the phase response and a part which corrects the amplitude response.

It is also advantageous for the regulator device to have mutually independent regulators for the generation of closed-loop control signals relating to the lateral direction on the one hand and relating to the longitudinal direction on the other hand. While the closed-loop control processes are initially carried out separately from one another in the lateral and longitudinal directions, the separate closed-loop control signals can subsequently be combined.

The regulator device is preferably designed to damp the oscillating movement of the external load. This is done by automatically feeding back the signals which describe the oscillations. After control-engineering processing, these closed-loop control signals lead to control deflections (cyclic, collective and pedal control) of the helicopter, which initiate a longitudinal and a lateral translational movement. The movement of the helicopter automatically compensates for lateral and longitudinal oscillations.

The controlled variables Which can be fed back via specific regulators, for example to the cyclic lateral and longitudinal control, are generated on the basis of the measured oscillating movements of the external load relative to the helicopter dynamics. The regulator device can then be used to add, closed-loop control for load oscillation damping to existing flight control regulators. The dynamics of the overall helicopter system are influenced by adaptation of the regulator parameters as a function of the flight state. The flight state is defined in particular by the speed of flight, the supporting cable harness length, the external load weight and the aerodynamic characteristics of the external load.

The principle of operation of oscillation damping using the regulator device according to the invention is based on the idea that the helicopter must have a tendency to follow the movement of the external loads. The helicopter must therefore effectively be positioned above the external load, with the aim being to achieve an optimum compromise between oscillation damping and a minor discrepancy from the desired flight path.

While, in the case of manual control, the pilot will attempt to compensate for the force acting on the helicopter from the oscillating external load by opposite control actions, a regulator device that is designed for oscillation damping, together with the closed-loop control signals being introduced as a damping control strategy into the open-loop control system of the helicopter, make it possible to react more quickly and in consequence more effectively to oscillations. This is because the system dead times are governed only by electrical signal processing and not additionally by the reaction time of the pilot. Therefore, in comparison to manual damping with increased latency times, less correction control is required, thus minimizing undesirable discrepancies from the current flight state. This improves the transport efficiency. Furthermore, flight safety is considerably improved by taking the closed-loop control task completely away from the pilot.

However, this automatic oscillation damping is feasible only if critical states are reliably prevented. This is precisely what is done by transferring the oscillating movement back to the geodetic coordinate system, independently of the attitude and rotation rate of the helicopter.

Alternatively or additionally to damping of the oscillating movement of the external load, the regulator device can also be designed to assist the positioning of the external load at an intended location. This means that the external load is on the one hand still under the influence of constraints and disturbance conditions during hovering flight, and on the other hand, can be changed from a current actual position to a nominal position for fine positioning purposes, as a result of which the external load reaches the intended position with minimal overshooting, and possibly even on a predetermined trajectory.

For this purpose, the variables which have been converted to the geodetic coordinate system for the oscillating movement, that is to say the oscillation angles and oscillation rates of the external load, are passed to the regulator device in order to determine the closed-loop control signals. These closed-loop control signals can then be fed back to the cyclic control inputs. Furthermore, the closed-loop control signals take account of the position discrepancies and flight speeds of the helicopter, as well as the oscillation angle and the oscillation rates of the external load. The closed-loop-control signals can lead via control-engineering processing to manipulated variables in the flight control system cyclic, collective and pedal control) on the helicopter which initiate a translational and vertical movement of the helicopter. On the one hand, this Movement results in the helicopter being moved to a desired nominal position. On the other hand, the automatic closed-loop position control has damping closed-loop control superimposed on it, which means that the external load is stabilized, and is suspended completely at rest under the helicopter, at the moment when the nominal position is reached.

The advantage of using the regulator device for positioning and support is that the automatic closed-loop control allows external loads to be positioned more efficiently (more quickly) and more effectively (more accurately), since the system dead times are governed only by electrical signal processing and not additionally by the reaction times of the pilot. In comparison to manual positioning with increased latency times, less correction control is therefore required, thus minimizing undesirable discrepancies from the current flight state. This improves the transport efficiency. Furthermore, flight safety is considerably improved by taking the closed-loop control task completely away from the pilot.

DESCRIPTION OF THE DRAWINGS

The invention will be explained in more detail in the following text with reference to the attached drawings.

DETAILED DESCRIPTION

Figure 1:
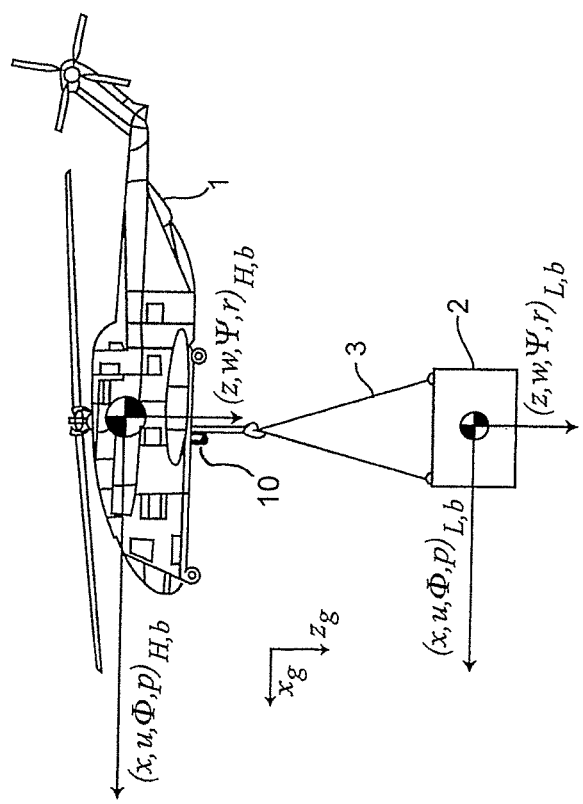
FIG. 1 shows a sketch, in the form of a side view, of a helicopter, with an attached external load.

FIG. 1 shows a helicopter 1 with an external load 2 which is suspended on at least one supporting cable 3, that is to say on a cable harness, on the underneath of the helicopter 1. The side view shows the alignment of the helicopter 1 and external load 2 in the longitudinal direction of the helicopter 1. A horizontal x axis is in each case defined for the helicopter 1 and the external load 2 in the helicopter-fixed coordinate system (index b). Furthermore, a z axis (z) is defined, which points downward, with the index H representing the helicopter 1 and the index L representing the external load 2.

Figure 2:
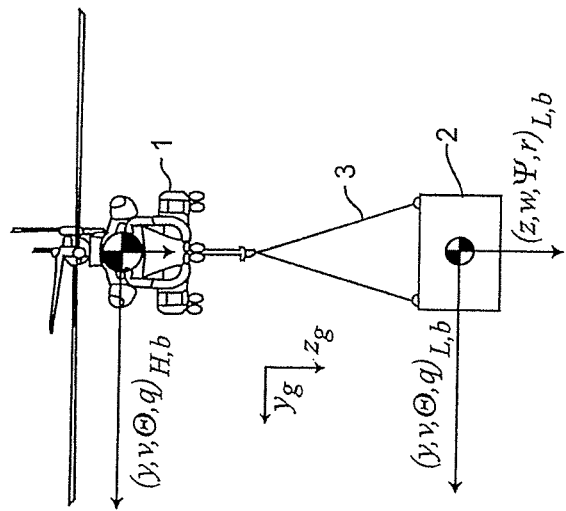
FIG. 2 shows a sketch, in the form of a front view, of a helicopter with an attached external load.

The y axis (y) for the helicopter 1 and the external load 2 can be seen in the front view illustrated in FIG. 2, which shows the lateral direction.

Furthermore, the Euler angles $\Phi$, $\Psi$ and $\Theta$ can be seen. In addition, the rotation rates p, q and r are shown. The variables u, v and w denote the speeds in the respective directions x, y and z.

The presence of the external load 2 leads to natural movements of the overall system of the helicopter 1 which are at the stability limit or are unstable. The profile of the eigen values of the oscillation dynamics is dependent on the cable length and the load weight. For example, if the cable harness is lengthened from 1 m to 100 m, the frequency of the oscillation in the eigen values IIIa, IIIb and IV and the damping of the yaw oscillation in the eigen value IIIc initially decrease. Furthermore, the longitudinal oscillation in the eigen value IV remains at the stability limit, while the yaw oscillation in the eigen value IIIb becomes more unstable for short cable harness lengths. For very long cable harnesses, the yaw oscillation and the longitudinal oscillation lie close together. The controllable oscillating movements of the external load 2 are detected, and provided for further calculation of a controlled variable, with the aid of a load oscillation recording unit 10 which is fitted under the helicopter 1 and, for example, may be in the form of a camera.

Figure 4:
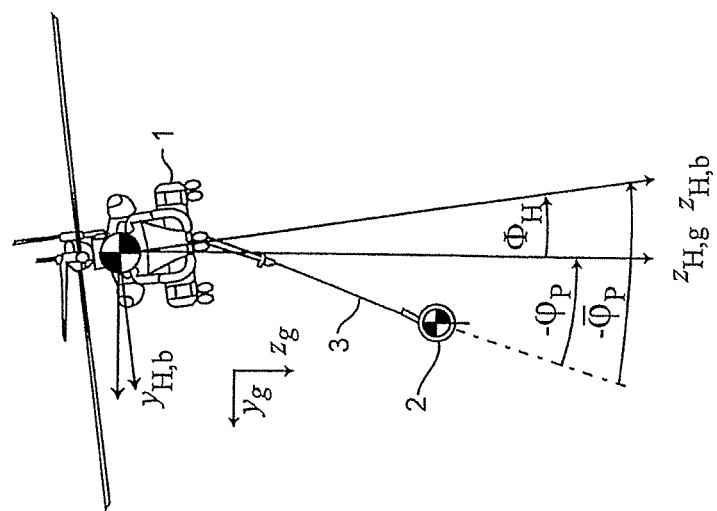
FIG. 4 shows a sketch, in the form of a front view, of the helicopter shown in FIG. 3.
Figure 3:
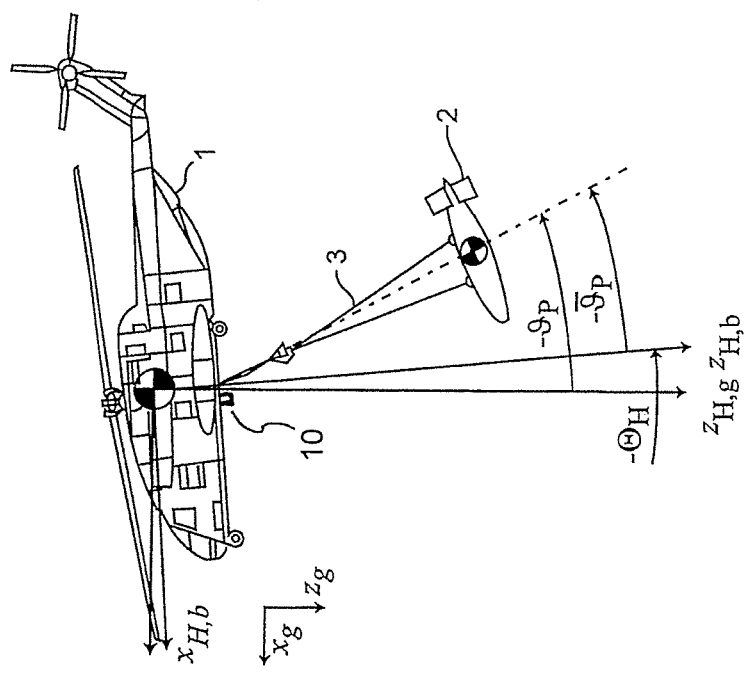
FIG. 3 shows a sketch, in the form of a side view, of a helicopter with an oscillating attached external load.

FIGS. 3 and 4 show the helicopter 1 from FIGS. 1 and 2 in the longitudinal and lateral directions, with an oscillating external load 2. These figures clearly show that the x, y and z axes in the helicopter-fixed coordinate system $x_H$, b, $y_H$, b, $z_H$, b differ from the associated coordinates in the geodetic coordinate system $x_g$, $y_g$, $z_g$, $z_H$, g. FIGS. 3 and 4 clearly show the oscillation angles $\theta_P$ in the longitudinal direction and $\phi_P$ in the lateral direction. The associated oscillation rates are annotated $\dot{\theta}_P$ and $\dot{\phi}_P$. These describe the deflections of the external load 2 in the geodetic system (index g) with constant azimuth. However, the corresponding variables in the oscillating movement are recorded using the helicopter-fixed coordinate system, as a result of which these variables $\bar{\theta}_P$ and $\bar{\phi}_P$ must first of all be converted.

The load recording unit for recording the variables for the oscillating movement should be such that the signal delay in the provision of the controlled variables is as short as possible. This also applies to the sensors for providing the attitude information for the helicopter 1. The typical orders of Magnitude of delay times from rotation rate sensors are in the range from 200 ms to 100 ms. Assuming a maximum, theoretic frequency of the continuous signal of the oscillating movement of $\omega_{max}$=10 rad/s, the sampling rate, in accordance with the Nyquist-Shannon sampling theorem, must be at least $2\omega_{max}$≈3 Hz, in order to allow the original signal to be reconstructed from the discrete-time signal, without information loss. Furthermore, the signal noise should be as low as possible. The oscillation recording unit should furthermore be as robust as possible to vibration, in order to produce results which are as accurate as possible.

Many implementations are feasible for measurement recording of the oscillation dynamics of the helicopter 1. In general, methods are preferred which do not rely on data being transferred from the external load system to the helicopter system. This reduces the complexity and fault susceptibility of the system. Furthermore, this simplifies the operational handling capability. By way of example, a data transfer such as this would be necessary for measuring the body-fixed translation and rotation acceleration of the external load 2 by means of acceleration sensors in order to calculate the position of the external load 2 relative to the helicopter 1 from this, and to obtain the information relating to oscillation deflections.

One effective possible way to determine the position of the external load 2 and to calculate the oscillation dynamics from the helicopter system is provided by optical image processing. A reference point, which can be seen visually, on the external load 2 is detected and tracked with the aid of a camera mounted on the underneath of the helicopter 1. The oscillation angles and oscillation rates are calculated from the image information obtained in the helicopter-fixed coordinate system. Digital signal processing results in relatively short signal delays and only a small amount of measurement noise.

Figure 6:
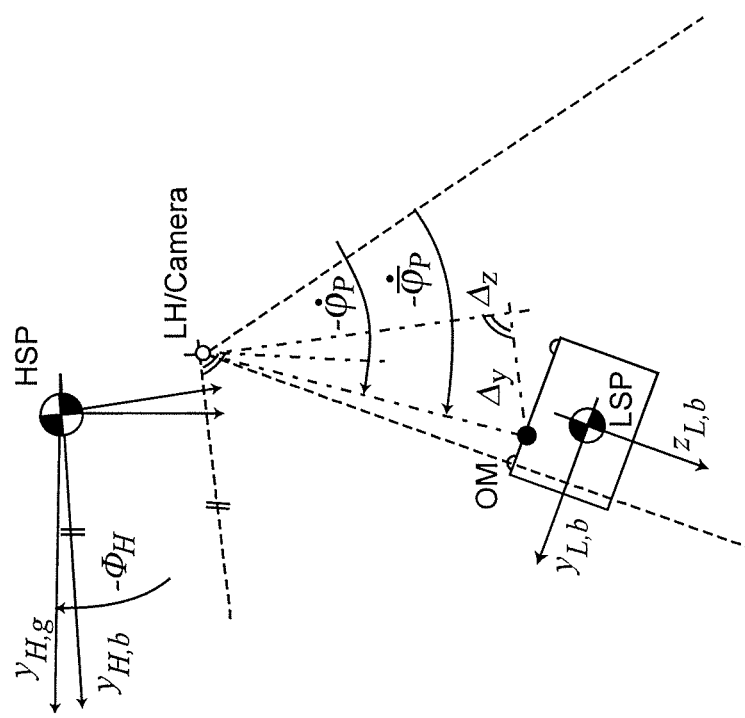
FIG. 6 shows a sketch corresponding to FIG. 5, in the lateral direction of the helicopter.
Figure 5:
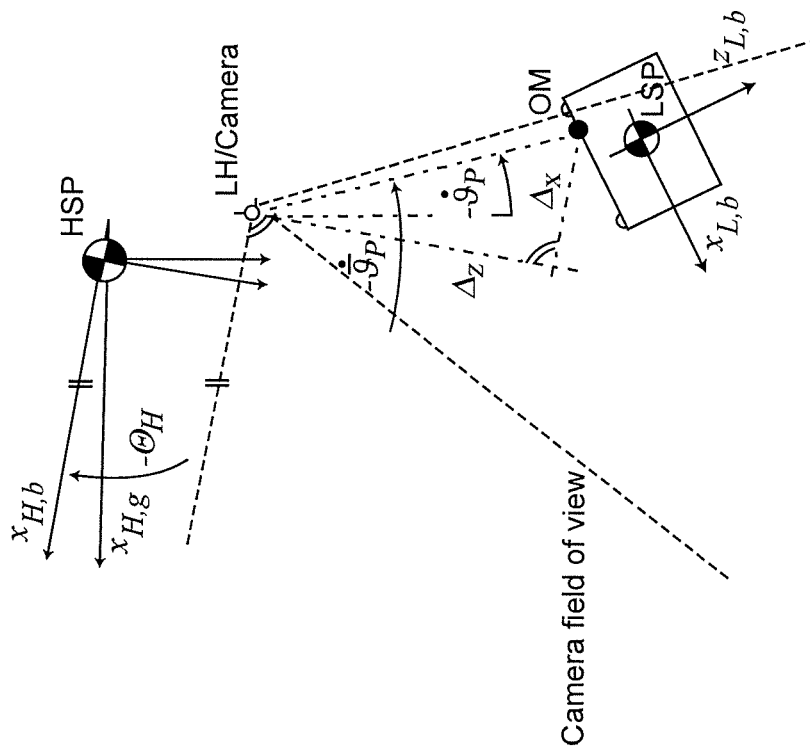
FIG. 5 shows a diagram of the direction and oscillation angles in the helicopter-fixed and in the geodetic coordinate system, in the longitudinal direction of the helicopter.

The information and directions recorded by a camera as the load oscillation recording unit are sketched by way of example in FIGS. 5 and 6 in the longitudinal and lateral directions, with respect to the oscillating external load 2 shown in FIGS. 3 and 4.

The oscillation angle and oscillation rates are measured optically with the aid of the camera K, one in the inertial measurement platform IMU, an optical marking OM on the external load 2 and image processing software. By way of example, the camera K was placed at the location of the load hook LH for the cable harness. Alternatively, however, it is also possible to choose any other point on the helicopter 1 from which the external load 2 can be seen. The field of view of the camera K should have an aperture angle in the range from 60° to 180° (without panoramic view). The optical marking OM, which is identified in the camera image by image processing software by its shape and color, can, for example, be applied to the external load 2. It is likewise possible to passively scan the optical marking OM with infrared light, or to illuminate it actively, in order to allow detection by means of an infrared camera in poor lighting conditions or in the dark.

The camera K is mounted in the helicopter-fixed system (index b) and moves with the helicopter 1. Rotational movements of the helicopter 1 when the load position is stationary are perceived as an oscillation angle in the camera image. The oscillation angles $\bar{\phi}_P$ and $\bar{\theta}_P$ and the oscillation rates $\dot{\bar{\phi}}_P$ and $\dot{\bar{\theta}}_P$ are first of all measured by the load oscillation recording unit, using the helicopter-fixed system. The attitude and rotation rates of the helicopter 1 are mapped in these variables and in consequence must be subtracted in order to obtain the information about the pure rotational movement of the optical marking OM, and therefore of the external load 2. For this purpose, the attitude and rotation rates of the helicopter 1 are measured with the aid of the inertial measurement platform IMU. The signals are taken into account in the image processing. The oscillation angles $\phi_P$ and $\theta_P$ as well as the oscillation rates $\dot{\phi}_P$ and $\dot{\theta}_P$ in consequence relate to the geodetic system (index g), as a result of which the external load is suspended vertically under the helicopter 1 when both angles are 0.

Figure 7:
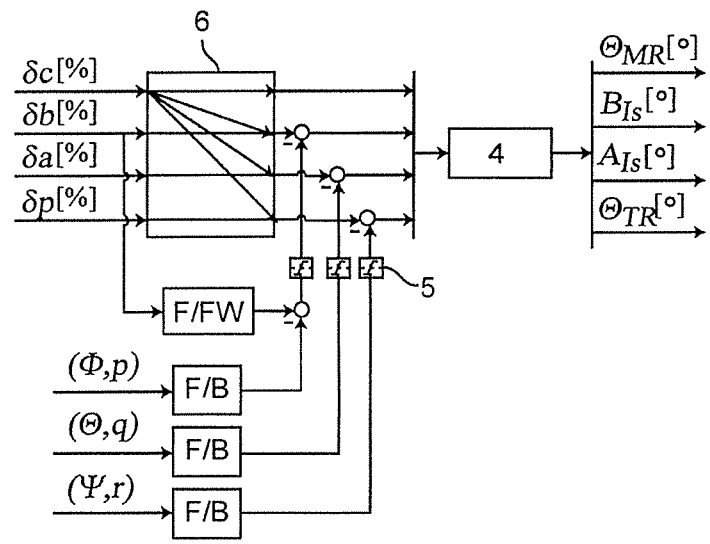
FIG. 7 shows a block diagram of a flight regulator for operating actuators in a helicopter.

By way of example, FIG. 7 shows a block diagram of a flight regulator for operating actuators 4 (servos) in the helicopter, in order to control and to stabilize the flight attitude of the helicopter. For this purpose, closed-loop control signals based on the Euler angles $\Phi$, $\Psi$, $\Theta$ and rotation rates p, q, r are superimposed on the cyclic open-loop control signals $\delta a$ (cyclic lateral control), $\delta b$ (cyclic longitudinal control), $\delta c$ (collective control) and $\delta p$ (pedal control), and these are processed in closed-loop control structures F/B to form closed-loop control signals and, after being limited by the limiter 5, are superimposed on the control variables, which are linked in a link 6 (control linkage).

Figure 8:
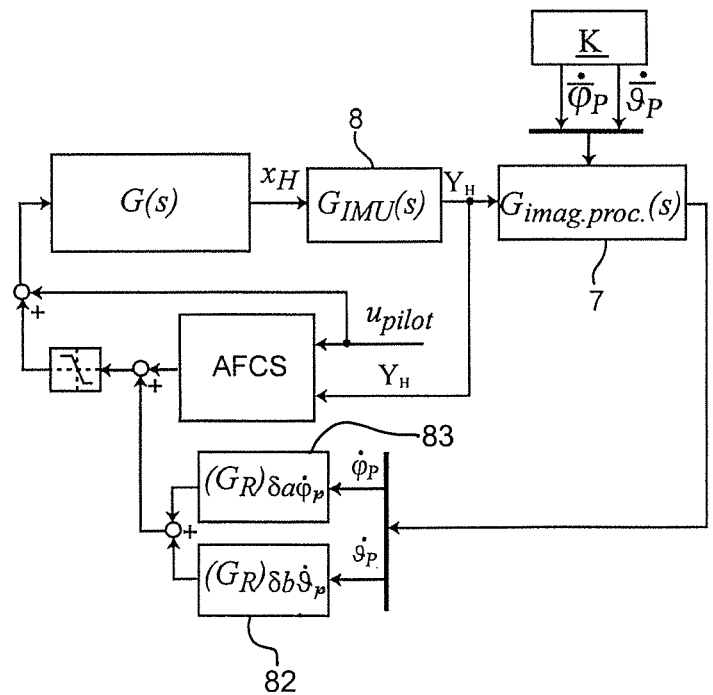
FIG. 8 shows a block diagram of a regulator device for damping oscillating movements of an external load.

FIG. 8 shows a block diagram, of a regulator device for damping the oscillating movement of an external load 2, as an example.

There are a multiplicity of methods for designing regulators which make it possible to implement the requirements for the closed control loop taking account of the control loop structure. Typical methods involve, for example, design based on the pole null-point distribution of the closed control loop and the frequency response of the open loop. As can be seen from the analyses of the open loop, a pure loop gain leads to instability for critical flight situations, that is to say those configurations in which the oscillations are already at the stability limit or are unstable. It is therefore necessary to adapt the profile of the frequency response in order to ensure an amplitude and phase boundary which are appropriately adequate for the requirements, with a sufficiently high loop gain.

In this case, by way of example, the regulator can be designed using an automated loop shaping method, although other methods, which can be found in the literature, can likewise be used. Optimum regulator transfer functions are obtained by phase and amplitude response modulation of the open control loop. The transfer functions of the open control loop, that is to say the transmission of control inputs relating to the oscillation, are determined in advance by means of system identification. The requirements for the closed control loop for stability, damping, and robustness are then converted to quality requirements for the frequency response of the open control loop. The automated method is based on an optimization algorithm which identifies suitable regulator parameters, matching the dynamics of the overall system to the formulated requirements. In consequence, the regulators 83 and 82 are subdivided into a phase-response-correcting part $G_{PM}(s)$ and an amplitude-response-correcting part $G_{AM}(s)$, and have the following basic form:

$$G_R(s) = k \cdot G_{PM}(s) \cdot G_{AM}(s) = k \underbrace{\frac{1+T_1 s}{1+T_2 s}}_{G_{PM}(s)} \cdot \underbrace{\frac{1+T_3 s}{1+T_4 s}}_{G_{AM}(s)},$$

where the front part of the fraction represents the phase-response-correcting part, and the rear part the amplitude-response-correcting part.

The parameters k, $T_1$, $T_2$, $T_3$ and $T_4$ are determined with the aid of an optimization algorithm on the basis of the system dynamics of the current flight state. The flight state is substantially governed by the airspeed, the weight and the inertia of the helicopter, the external load weight, the length of the supporting cable harness, and the aerodynamic characteristics of the external load. The authority of the overall regulator should be limited to a control amplitude of ±10% and a control rate of 100°/s.

It has been found from analyses of the frequency responses of various flight situations that the requirements for rapid and lasting damping and stabilization of oscillations can be achieved by adaptation of the frequency responses of the open loop. FIG. 8 shows the integration of the described regulator structure for oscillation damping in a flight regulator device. The oscillations $\dot{\phi}_P$ and $\dot{\theta}_P$ are recorded by the camera K and are processed in an image processing unit 7, by means of the helicopter dynamics $G_{IMU}(s)$ measured by the inertial measurement system 8 for the image processing algorithms ($G_{imag.proc.}(s)$) to form the reference variables $\dot{\phi}_P$ and $\dot{\theta}_P$. The two oscillation damping regulators $(G_R)_{\delta a_p}$ (element 83 in FIG. 8) and $((G_R)_{\delta b_p}$ (element 82 in FIG. 8) are used to produce correction inputs which are superimposed on the flight regulator AFCS, which in principle corresponds to the closed-loop control structure shown in FIG. 7. The control inputs from the pilot $u_{pilot}$ and the measured helicopter dynamics $Y_H$ are passed to the flight regulator. The closed-loop control signal for the flight regulator, which signal has the closed-loop control signals of the closed-loop control device for oscillation damping superimposed on it, once again, after limiting, has the control input from the pilot $u_{pilot}$-superimposed on it, and this is supplied to the overall system for the helicopter G(s), in order to operate the actuators 4 in the helicopter and therefore to damp the oscillating movement of the external load.

The parameters in the two closed-loop control parts $(G_R)_{\delta a_P}$ 83 and $(G_R)_{\delta b_P}$ 82 are determined by means of an optimization algorithm. Optimization algorithms such as these are adequately known per se and therefore do not need to be described any further.

Figure 9:
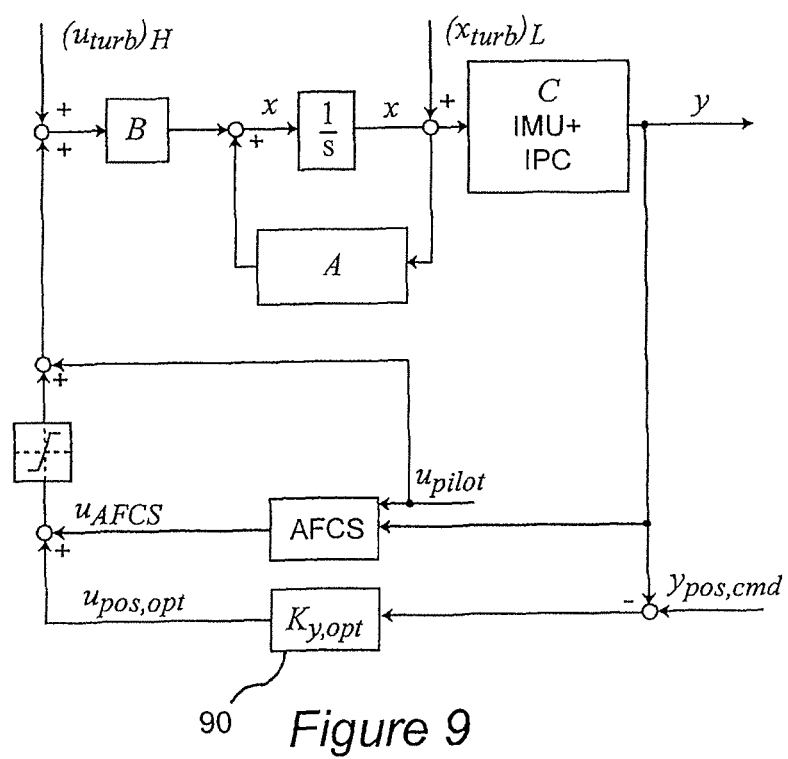
FIG. 9 shows a diagram of a flight regulator for assisting the positioning of an external load.

FIG. 9 shows a diagram of a regulator device for assisting the automatic positioning of an external load 2. The regulator device is designed for hovering flight as a reference state, since, in general, an external load is positioned during hovering flight. The presence of an external load detracts from the handling of the helicopter, in terms of translational positioning. This is more significant, in terms of the ratio to the helicopter, for heavy load bodies than for light load bodies. When external loads are attached, the poles of the oscillations are shown to reduce the amplitude and phase boundaries of the open control loop. The lateral oscillation pole III leads to a reduction in the phase boundary in comparison to the helicopter without an external load. The frequency response of the longitudinal speed of the helicopter is influenced by the longitudinal oscillation in the eigen value IV. In the control range which is effective for flight purposes, oscillating movements in the longitudinal and lateral directions are reflected in the transmission angle of a cyclic control input for the translational speed of the helicopter. In consequence, the dynamics of the oscillating external load, must be taken into account for positioning of the helicopter.

The closed-loop control of the positioning of loads is in principle known for the two-dimensional situation, from crane construction. The two tasks of positioning of a crane and damping of the oscillating movements of the load are solved as an integrated overall task. In the present case as well, the aim 1s to position the helicopter and at the same time to damp and to stabilize the external load movements. When the helicopter nominal position is reached, the external load must not be oscillating and must be suspended vertically under the helicopter, in order in this way to position the external load. The dynamic influence on the helicopter is compensated for by taking account of the load oscillation dynamics in the closed-loop control system. Otherwise, on reaching the nominal position, residual oscillating movements would always draw the helicopter away from its position; particularly in the case of heavy external loads. The controlled variables of the positioning closed-loop control are therefore given by the discrepancy between the actual position of the helicopter and the nominal position, and by the oscillation angles.

Linearly quadratic optimum state closed-loop control (LQ closed-loop control), as is also frequently used for gantry crane closed-loop control, can be used as a method for determining optimum closed-loop control parameters for external load positioning. Closed-loop control parameters which achieve optimum results in the sense of weighting of the state and control variables are determined with the aid of quality functions selected for the closed-loop control aim. The regulator is defined as a solution to an optimization problem. In the case of LQ closed-loop control, the states of the linear time variant system are amplified on a steady-state basis. This results in linear, time-invariant, state closed-loop control.

In order to allow LQ closed-loop control to be used, it must in consequence be possible to measure all system states, since, because of the process rule, these are caused entirely by the control inputs. However, in the case of the positioning of external loads with a helicopter, it is not possible to measure all states, because of the coupled system and the choice of the load oscillation recording unit. In order nevertheless to make it possible to achieve optimum state feedback, it is feasible to create a deterministic or stochastic observer. In the real control loop or the simulated model, a reduced model—the observer—is simulated in parallel, which produces all the states which, in the end, have an optimum effect, in terms of closed-loop control, on the control inputs. The method of linearly quadratic optimum state feedback can finally be applied by the provision of the complete state vector.

A further method for optimum closed-loop control is provided by the linearly quadratic optimum output feedback, which will be described in the following text with reference to FIG. 9. The advantage of the method over an observer design is the reduced modeling complexity since weighted optimum closed-loop control is likewise possible solely via the feedback of the measurable states as system outputs. The method is an extension of LQ closed-loop control but, in particular, with increased computation and integration complexity.

The closed-loop control systems can optionally have observers added to them, for example a Kalman filter, and this is adequately known per se.

FIG. 9 shows the regulator unit integrated in a flight regulator AFCS and in the form of an extended operating mode of the flight regulator. In consequence, the control inputs $u_{pos,opt}$ generated by the regulator 90 $K_{y,opt}$ for external load positioning are superimposed on control inputs from the flight regulator AFCS. By way of example, the authority of the overall regulator should be restricted to a control amplitude of ±10% and a control rate of 100°/S. Together with the controlled variable $u_{turb}$ and the pilot control variables $u_{Pilot}$ and regulator control variables $u_{AFCS}$ of the flight regulator AFCS and the optimum positioning, a turbulence model acts as a control variable for the helicopter on the loop model with the loop components B, the delay 1/s and the overall system A of the helicopter. The vector u includes the four pilot controls (cyclic longitudinal and lateral control, collective and pedal control) as system inputs. The vector x includes the system states, and the vector y the measured system outputs.

The optimization condition of the linearly quadratically optimum output closed-loop control relates to the requirement that a defined quality function J be minimized when the system changes from the initial state $x_0$ to the final state $x_e$ in the time interval $[o, t_e]$. The quality function J is in general a quadratic function which, in addition to the weighting of the system states, likewise rates the manipulated variable deflections. The optimum regulator $K_{y,\ opt}$, which corresponds to the flight state, for closed-loop control of the positioning of the external load, is calculated by means of an optimization algorithm.

This regulator device can be implemented with the regulator $K_{y,\ opt}$, for example a positioning regulator with PD closed-loop control. In this case, the outputs should be fed back proportionally. In the case of eight measurement variables $y_{pos,\ nom}$ and the corresponding eight controlled variables, as well as the four resultant closed-loop control signals $u_{pos,\ opt}$, this results in a closed-loop control device with a 4×8 matrix.

The measured variables y include the variables of the oscillating movement of the external load. As described above, the oscillating movement is determined with the aid of a camera K, an inertial measurement system IMU and an image processing and evaluation unit IPC. This corresponds to the module 7 from FIG. 8 in conjunction with the camera K.

The invention claimed is:

1. A regulator device for a helicopter wherein said helicopter is configured to carry an external load suspended from the helicopter in a direction of the ground on at least one supporting cable, comprising:
   at least one load oscillation recording unit for recording an oscillating movement of the external load in lateral and longitudinal directions with respect to a longitudinal axis of the helicopter; and one or more regulators which convert detected variables for the oscillating movement from said at least one load oscillation recording unit to a geodetic coordinate system, and generate closed-loop control signals as a function of the variables converted to the geodetic coordinate system for the oscillating movement of the external load, wherein said closed-loop control signals are a function of a mass ($m_L$) of the external load and a length ($l_s$) of the at least one supporting cable as parameters, and wherein said closed-loop control signals are applied to open-loop control signals for controlling flight of the helicopter.

2. The regulator device as claimed in claim 1, wherein said detected variables for the oscillating movement include changes in oscillation angles between a connecting line from the external load to a suspension point on the helicopter and a vertical ($\dot{\phi}_P, \dot{\theta}_P$) which points vertically downward from the suspension point of the helicopter parallel to a vertical axis of the helicopter.

3. The regulator device as claimed in claim 1, wherein the at least one load oscillation recording unit is a camera fitted underneath the helicopter which records images or image sequences with the oscillating external load, wherein the image processing unit.

4. The regulator device as claimed in claim 1, wherein said one or more regulators have a first regulator part which corrects a phase response and a second regulator part which corrects an amplitude response.

5. The regulator device as claimed in claim 1, wherein said one or more regulators are mutually independent regulators for the generation of said closed-loop control signals as they relate to the lateral direction and the longitudinal direction.

6. The regulator device as claimed in claim 1, wherein the closed-loop control signals damp the oscillating movement of the external load.

7. The regulator device as claimed in claim 1, wherein the closed-loop control signals assist in positioning of the external load at an intended location.

8. The regulator device as claimed in claim 7, wherein said detected variables for the oscillating movement include at least one of the oscillation angles ($\phi_P, \theta_P$), and a discrepancy between a position of the external load and a position of an intended location.

9. The regulator device as claimed in claim 1, wherein said one or more regulators use a current speed of the helicopter over the ground as a parameter.

* * * * *